S. GISSINGER.
LEVEL.
No. 191,954. Patented June 12, 1877.
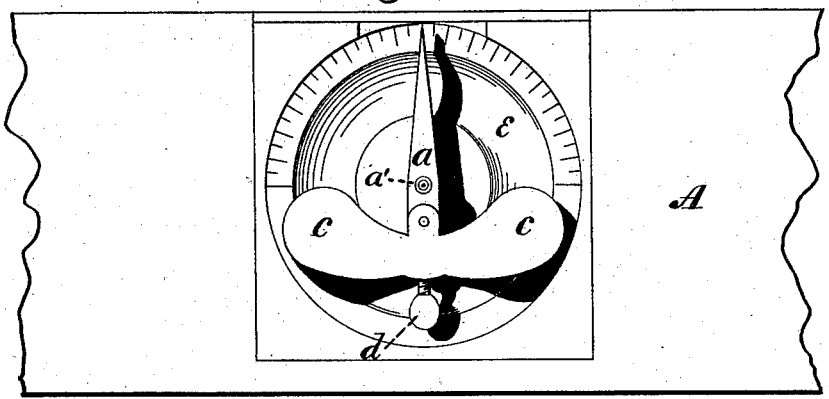
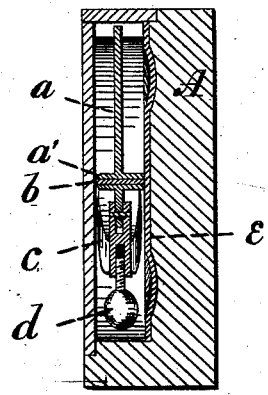
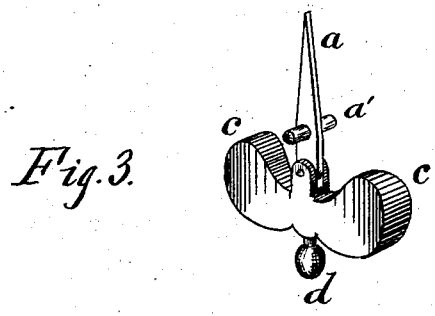
Witnesses
F. A. Pollock.
G. Smith
Samuel Gissinger Inventor
By Connolly Bros & McTighe
Attorneys

UNITED STATES PATENT OFFICE.

SAMUEL GISSINGER, OF PITTSBURG, PENNSYLVANIA, ASSIGNOR OF ONE-HALF HIS RIGHT TO E. W. SWENTZEL, OF SAME PLACE.

IMPROVEMENT IN LEVELS.

Specification forming part of Letters Patent No. 191,954, dated June 12, 1877; application filed November 27, 1876.

*To all whom it may concern:*

Be it known that I, SAMUEL GISSINGER, of Pittsburg, in the county of Allegheny and State of Pennsylvania, have invented certain new and useful Improvements in Plumbs, Levels, and Clinometers; and I do hereby declare the following to be a full, clear, and exact description of the invention, such as will enable others skilled in the art to which it pertains to make and use it, reference being had to the accompanying drawings, which form part of this specification, in which—

Figure 1 is a front elevation. Fig. 2 is a vertical transverse section through the middle of Fig. 1. Fig. 3 is a view of my device separately.

This invention relates to improvements in that class of instruments known as "plumbs," "levels," and "clinometers;" and consists, first, in constructing the pendulum with a pivotal joint below the primary center of oscillation, to render the device more sensitive and easy of movement; and, secondly, in an adjustable weight at the lower end, whereby the center of gravity may be altered at pleasure, in order to facilitate the proper adjustment of the weighted arms.

In the drawings, *a* designates the pointer-pendulum, whose pivotal portion consists in a horizontal barrel, *a'*, having one or both ends beveled down to a knife-edge to prevent friction. This hangs and oscillates upon a pivot, *b*, as seen. Below the pivot *b* the system is jointed again, the gravitating portion consisting of two outwardly-extending weights, *c c*, having their mass so arranged that their center of gravity will lie in the vertical line of the system, and as near as may be to the primary center of oscillation, or, at least, to the secondary joint. This renders the pendulum very sensitive, since the weights extend out some distance, and the center of gravity is almost at the pivotal point, thereby causing a movement upon very slight disturbance, and that movement is rendered very even and gentle, its smoothness of operation being still further enhanced by the secondary joint, which serves to break the vibrations that otherwise might take place, so that any motion of the device, or, rather, its casing, will produce an instance response in the pendulum, which will move steadily into its new position relatively to the casing. At the bottom a threaded opening is made, into which screws an adjusting-ball, *d*, by means of which the center of gravity may be raised or lowered, so as to affect the stability of equilibrium or the sensitiveness of the parts.

The whole device is, as said, hung upon a pivot, *b*, which forms the center of oscillation, and projects from the center of a dial-plate, *e*, whose edge may be marked with the vertical and horizontal scores only, or may be graduated off in degrees, as desired.

As a level, the instrument is shown in Figs. 1 and 2, where the device is set into a recess, cut into the usual form of a wooden bar, A. In this the level is established when the pointer indicates the vertical, which is the zero point of the arc.

As a plumb, the instrument is unchanged, being simply turned on end, the perpendicular being established when the pendulum points to the scores that are made on the dial for that purpose.

Points between these two positions indicate an acute or obtuse angle, and then the instrument becomes a clinometer.

Having thus fully described my invention, what I claim is—

1. A plumb, level, and clinometer pendulum, constructed in two parts, with a joint below the primary center of oscillation, for the purpose of breaking up the vibrations of the pendulum and quickly bringing it to a state of rest, substantially as described.

2. In combination with pendulum *c c*, the adjustable ball or weight *d*, substantially as and for the purposes explained.

In testimony that I claim the foregoing I have hereunto set my hand this 28th day of October, 1876.

S. GISSINGER.

Witnesses:
R. I. KOCHLEE,
B. MCKENNA.